(12) United States Patent
Schmidt et al.

(10) Patent No.: US 8,320,575 B2
(45) Date of Patent: Nov. 27, 2012

(54) EFFICIENT AUDIO SIGNAL PROCESSING IN THE SUB-BAND REGIME

(75) Inventors: Gerhard Uwe Schmidt, Ulm (DE); Hans-Jörg Köpf, Amstetten (DE); Günther Wirsching, Eichstätt (DE)

(73) Assignee: Nuance Communications, Inc., Burlington, MA (US)

( * ) Notice: Subject to any disclaimer, the term of this patent is extended or adjusted under 35 U.S.C. 154(b) by 926 days.

(21) Appl. No.: 12/241,788

(22) Filed: Sep. 30, 2008

(65) Prior Publication Data

US 2009/0086986 A1    Apr. 2, 2009

(30) Foreign Application Priority Data

Oct. 1, 2007  (EP) ..................................... 07019281

(51) Int. Cl.
*H04B 3/20*   (2006.01)
(52) U.S. Cl. .......................................... 381/66; 382/100
(58) Field of Classification Search .................... 381/66; 382/100
See application file for complete search history.

(56) References Cited

U.S. PATENT DOCUMENTS

| | | | |
|---|---|---|---|
| 5,272,695 A | 12/1993 | Makino et al. | |
| 6,898,235 B1 * | 5/2005 | Carlin et al. | 375/219 |
| 8,015,368 B2 * | 9/2011 | Sharma et al. | 711/147 |
| 8,050,914 B2 * | 11/2011 | Schmidt et al. | 704/226 |
| 2007/0071277 A1 * | 3/2007 | Van Der Veen et al. | 382/100 |
| 2008/0140396 A1 * | 6/2008 | Grosse-Schulte et al. | 704/227 |
| 2008/0263285 A1 * | 10/2008 | Sharma et al. | 711/147 |
| 2009/0086986 A1 * | 4/2009 | Schmidt et al. | 381/66 |
| 2009/0119096 A1 * | 5/2009 | Gerl et al. | 704/207 |
| 2009/0216526 A1 * | 8/2009 | Schmidt et al. | 704/226 |
| 2010/0215184 A1 * | 8/2010 | Buck et al. | 381/66 |
| 2010/0286981 A1 * | 11/2010 | Krini et al. | 704/206 |
| 2011/0019835 A1 * | 1/2011 | Schmidt et al. | 381/71.11 |

FOREIGN PATENT DOCUMENTS

| | | |
|---|---|---|
| EP | 2045801 A1 * | 4/2009 |
| GB | 2426167 | 11/2006 |

OTHER PUBLICATIONS

Gay, S. et al., "Fast converging subband acoustic echo cancellation using RAP on the WE DSP16A," Presented at the ICASSP, International Conference on Acoustics, Speech and Signal Processing, Apr. 3, 1990; pp. 1141-1144.
Lu, X. et al., "Acoustic echo cancellation with post-filtering in sub-band," 2003 IEEE Workshop on Applications of Signal Processing to Audio and Acoustics, New Paltz, NY, USA, Oct. 19-22, 2003, pp. 29-32.
Hänsler, E. and Schmidt, G., "Acoustic Echo and Noise Control—A Practical Approach," John Wiley & Sons, New York, 2004.
European Patent Office, Office Action, Application No. 07019 281.0, dated Jun. 2, 2009, 5 pages.

* cited by examiner

*Primary Examiner* — Laura Menz
(74) *Attorney, Agent, or Firm* — Sunstein Kann Murphy & Timbers LLP

(57) ABSTRACT

A signal processing system enhances an audio signal. The audio signal is divided into audio sub-band signals. Some audio sub-band signals are excised. Other audio sub-band signals are processed to obtain enhanced audio sub-band signals. At least a portion of the excised audio sub-band signals are reconstructed. The reconstructed audio sub-band signals are synthesized with the enhanced audio sub-band signals to form an enhanced audio signal.

10 Claims, 6 Drawing Sheets

EFFICIENT AUDIO SIGNAL PROCESSING IN THE SUB-BAND REGIME

BACKGROUND OF THE INVENTION

1. Priority Claim

This application claims the benefit of priority from European Patent Application No. 07019281.0, filed Oct. 1, 2007, which is incorporated by reference.

2. Technical Field

This application relates to signal processing and, more particularly, to processing audio signals in a sub-band regime.

3. Related Art

Audio communication systems may operate in noisy environments. Noise may interfere with some communication systems, such as voice recognition systems and hands-free voice communication systems. When a voice recognition system operates in a noisy environment, the noise may interfere with the ability of the voice recognition computer to recognize a user's voice commands. Hands-free voice communication systems may also be susceptible to background noise and echo. Echo may occur when a system microphone picks up an audio signal played from a system loudspeaker.

To increase the quality of these communications, audio communication systems may process the audio signals to remove noise and/or echo components. This type of processing may be computationally complex. For example, memory demand and computation time may be relatively high for these processes. Therefore, a need exists for a more efficient way to process audio signals.

SUMMARY

A signal processing system enhances an audio signal. The audio signal is divided into audio sub-band signals. Some audio sub-band signals are excised. Other audio sub-band signals are processed to obtain enhanced audio sub-band signals. At least a portion of the excised audio sub-band signals are reconstructed. The reconstructed audio sub-band signals are synthesized with the enhanced audio sub-band signals to form an enhanced audio signal.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A signal processing system may enhance an audio signal. The system may process the audio signal in a sub-band regime by dividing the audio signal into multiple sub-band signals. A portion of the sub-band signals may be excised to increase signal processing efficiency, and a remaining portion of the sub-band signals may be processed to obtain an enhanced audio signal.

Figure 1:
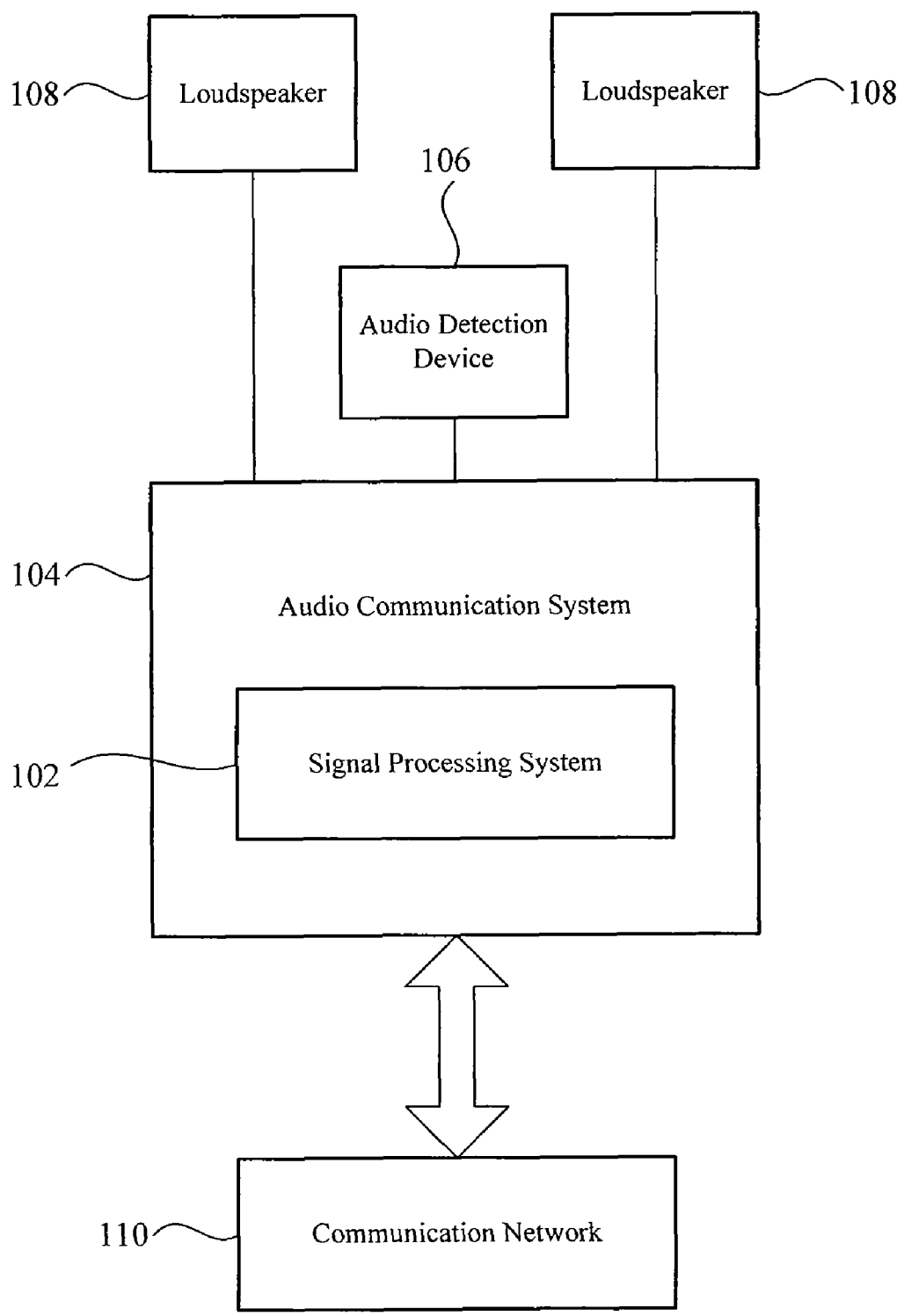
FIG. 1 shows a signal processing system.

FIG. 1 shows a signal processing system 102 in communication with an audio communication system 104. The audio communication system 104 may be a voice recognition system, hands-free voice communication system, or other audio system. An audio detection device 106 may interface with the audio communication system 104. The audio detection device 106 may include one or more microphones or other devices that detect audio signals and transmit the detected signals to the audio communication system 104 for processing. The audio communication system 104 may also interface with one or more loudspeakers 108. The loudspeakers 108 may receive audio signals from the audio communication system 104 and make those signals audible for users in a vicinity of the loudspeakers 108.

In some implementations, the audio communication system 104 may interface with a communication network 110. The audio communication system 104 may transmit audio signals across the communication network 110 to one or more other communication systems. Also, the audio communication system 104 may receive audio signals from other communication systems through the communication network 110. In one implementation, a user of the audio communication system 104 may participate in a voice conversation with a remote party through the communication network 110. The audio detection device 106 may detect the user's speech, and the loudspeakers 108 may transmit speech received from the remote party.

The audio communication system 104 may operate in a noisy environment. The noise may include background noise, echo, or other interference. Echo may occur in the communication system 104 when the audio detection device 106 picks up an audio signal transmitted from the loudspeakers 108. The audio communication system 104 may use the signal processing system 102 to attenuate noise and obtain an enhanced audio signal.

Figure 2:
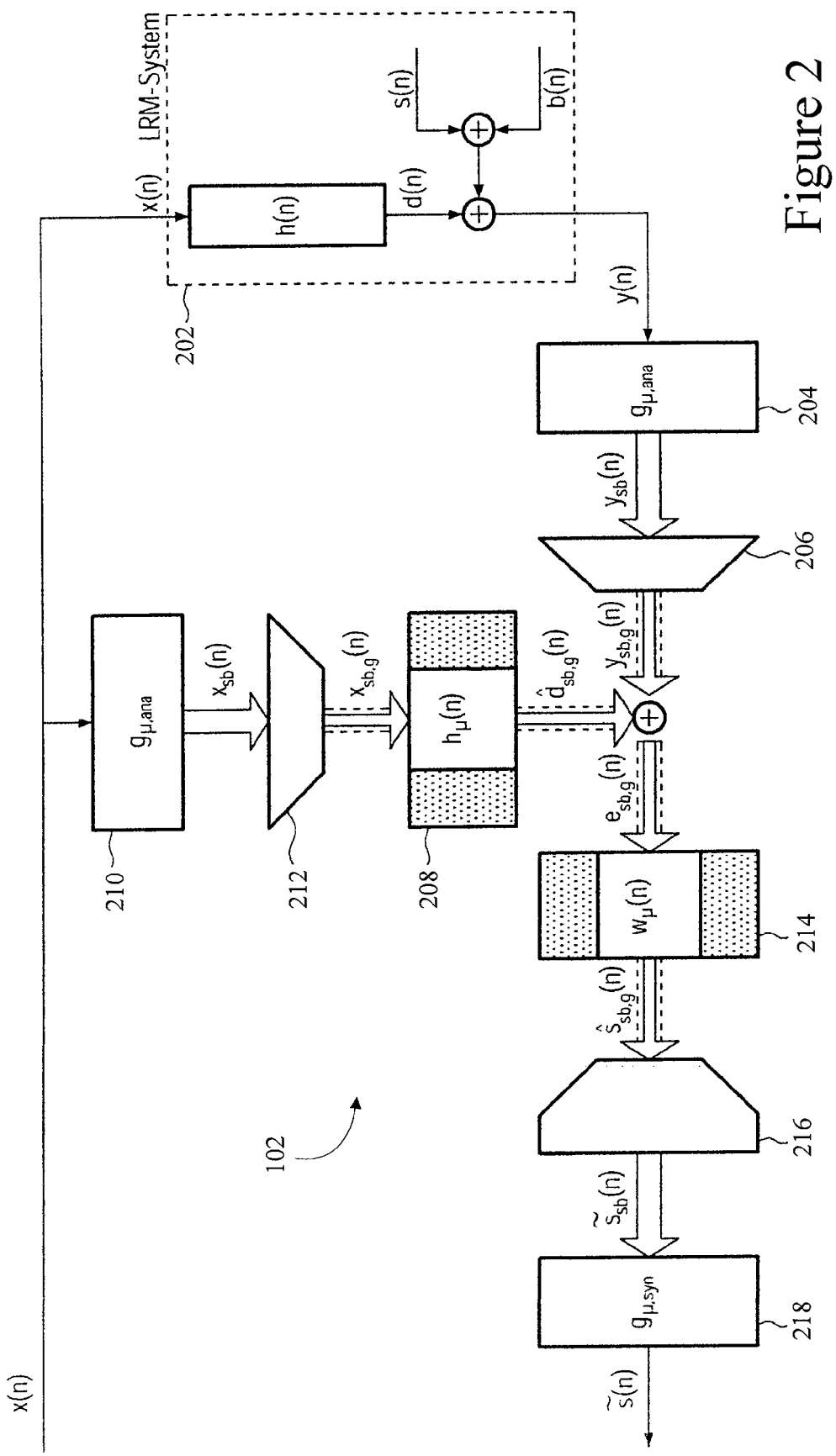
FIG. 2 is one implementation of the signal processing system of FIG. 1.

FIG. 2 illustrates one implementation of the signal processing system 102. In FIG. 2, the signal processing system 102 may enhance an audio signal y(n). The audio signal y(n) may be part of a telephone conversation between a remote party and a near party. The near party may use a hands-free set that includes a loudspeaker (e.g., the loudspeaker 108 of FIG. 1) and a device that converts speech into an analog or digital signal (e.g., the audio detection device 106 of FIG. 1). A communication system at the near side (e.g., the communication system 104 of FIG. 1) may receive a signal x(n) from the remote party. The signal x(n) may be speech from the remote party. The communication system may convert the signal x(n) into an audible range through a loudspeaker.

The near party and the loudspeaker may be contained within a room (e.g., a vehicle compartment or other space). The room may be part of a loudspeaker-room-microphone (LRM) system 202. The LRM system 202 may be characterized by an impulse response h(n). Although the microphone of the LRM system 202 may be tuned to detect a speech signal s(n) of the near side speaker, the microphone may also detect background noise b(n) and an echo contribution d(n) caused by the loudspeaker output. Therefore, the audio signal generated by the microphone may be represented as $y(n)=s(n)+b(n)+d(n)$.

The signal processing system 102 enhances the audio signal y(n) by processing the audio signal y(n) in a sub-band regime. To process the audio signal y(n) in the sub-band regime, the audio signal y(n) is filtered by an analysis filter bank $g_{\mu,ana}$ 204 to obtain the audio sub-band signals $y_{sb}(n)$. The analysis filter bank 204 may include low-pass, band pass, and/or high-pass filters. In some implementations, the analysis filter bank 204 may be formed from one or more Discrete Fourier Transformation (DFT) filters, Discrete Cosine Transformation (DCT) filters, or Fast Fourier Transformation (FFT) filters. The analysis filter bank 204 may comprise a Hann or Hamming window. The analysis filter bank 204 divides the audio signal y(n) into M audio sub-band signals $y_{sb}(n)$. M represents the order of the DFT, DCT or FFT filters, for example, or the channel number of the analysis filter bank 204, in general.

After the audio signal y(n) is divided into multiple audio sub-band signals $y_{sb}(n)$, the audio sub-band signals $y_{sb}(n)$ may be passed to a filter 206. The filter 206 may serve to excise a portion of the audio sub-band signals $y_{sb}(n)$. The filter 206 may excise a subset of the audio sub-band signals $y_{sb}(n)$ leaving a remaining subset of audio sub-band signals $y_{sb,g}$. The filter 206 may excise a predetermined number of the audio sub-band signals $y_{sb}(n)$, such as every other audio sub-band. In the implementation of FIG. 2, the filter 206 may excise each of the audio sub-band signals $y_{sb}(n)$ with an odd index number. Therefore, the remaining audio sub-band signals $y_{sb,g}$ may be the audio sub-band signals $y_{sb}(n)$ that have an even index number.

The remaining audio sub-band signals $y_{sb,g}$ may be filtered to enhance signal quality. In one implementation, a Wiener filter may attenuate noise components of the remaining audio sub-band signals $y_{sb,g}$. In the implementation of FIG. 2, the remaining audio sub-band signals $y_{sb,g}$ are filtered by an echo compensation filter 208 that may be represented by the following equation:

$$\hat{h}_\mu(n)=[\hat{h}_{\mu,0}(n),\hat{h}_{\mu,1}(n),\ldots \hat{h}_{\mu,N-1}(n)]^T.$$

The echo compensation filter 208 may have a length N (e.g., the number of filter coefficients for each sub-band μ) for modeling the impulse response of the LRM system 202. The echo compensation filter 208 may be an infinite impulse response filter (IIR), adaptable finite impulse response filter (FIR), or other filter to compensate for echo effects. In some applications, about 256/r to about 1000/r filter coefficients may be used, where r denotes the factor of down-sampling of the sub-band signals. In other implementations, a different number of filter coefficients may be used.

Some adaptation methods for the echo compensation filter 208 may be iterative methods (e.g., in full band):

$$\hat{h}(n+1)=\hat{h}(n)+\Delta\hat{h}(n).$$

In one implementation, the adaptation method for the echo compensation filter 208 may be the normalized least mean square (NLMS) algorithm:

$$\hat{h}(n+1) = \hat{h}(n) + \kappa(n)\frac{x(n)e(n)}{\|x(n)\|^2}.$$

The vector of the reference signal may be represented by:

$$x(n)=[x(n), x(n-1),\ldots, x(n-N+1)]^T.$$

The error signal e(n) represents the difference of the audio signal (e.g., the signal detected by the microphone) and the output of the echo compensation filter 208. The error signal e(n) may be represented by:

$$e(n)=y(n)-\hat{d}(n)=y(n)-\hat{h}^T(n)x(n).$$

The corrector step is adjusted by means of the real number κ. Accordingly, in the sub-band regime the normalized least mean square (NLMS) algorithm may be:

$$\hat{h}_{sb}(n+1) = \hat{h}_{sb}(n) + \kappa_{sb}(n)\frac{x_{sb}(n)e^*_{sb}(n)}{\|x_{sb}(n)\|^2}.$$

The asterisk denotes the complex conjugate and $\kappa_{sb}(n)$ adjusts the corrector step. The vector of the reference signal may be represented by:

$$x_{sb}(n)=[x_{sb}(n), x_{sb}(n-1),\ldots, x_{sb}(n-N+1)]^T \text{ and}$$

$$e_{sb}(n)=y_{sb}(n)-\hat{d}_{sb}(n)=y_{sb}(n)-\hat{h}_{sb}^H(n)x_{sb}(n).$$

The upper index H denotes the Hermitian adjugate.

Because the filter 206 excises a portion of the audio sub-band signals $y_{sb}(n)$, the echo compensation filter 208 may operate on the sub-bands that correspond to the remaining audio sub-band signals $y_{sb,g}$. If the filter 206 excised the odd sub-bands and passed the even sub-bands, then the echo compensation filter 208 may operate on only the even sub-bands as well. Therefore, the echo compensation filter 208 may save computational resources and time by not echo compensating the odd sub-bands.

To echo compensate only the sub-bands that are passed by the analysis filter bank 206, the signal processing system 102 may process the reference signal x(n) in a manner that is similar to the processing applied to the detected signal y(n). In one implementation, the reference signal x(n) may be passed through an analysis filter bank 210 to obtain reference sub-band signals $x_{sb}(n)$. Specifically, the analysis filter bank 210 divides the reference signal x(n) into multiple reference sub-band signals $x_{sb}(n)$. The analysis filter bank 210 may be substantially similar or identical to the analysis filter bank 204 used for dividing the detected signal y(n) into sub-bands. In one implementation, the analysis filter bank 210 may comprise a Hann or Hamming window.

After the reference signal x(n) is divided into multiple reference sub-band signals $x_{sb}(n)$, the reference sub-band signals $x_{sb}(n)$ are passed to a filter 212. The filter 212 serves to excise a portion of the reference sub-band signals $x_{sb}(n)$. The filter 212 may excise a subset of the reference sub-band signals $x_{sb}(n)$ leaving a remaining subset of reference sub-band signals $x_{sb,g}$. In one implementation, the remaining reference sub-band signals $x_{sb,g}$ are equal in number to the remaining audio sub-band signals $y_{sb,g}$. The filter 212 may excise the reference sub-band signals $x_{sb}(n)$ that correspond to the audio sub-band signals $y_{sb}(n)$ that were excised by the filter 204. In the implementation of FIG. 2, the filter 206 may excise each of the audio sub-band signals $y_{sb}(n)$ with an odd index number. Therefore, the filter 212 may excise each of the reference sub-band signals $x_{sb}(n)$ with an odd index number. The remaining reference sub-band signals $x_{sb,g}$ may be the reference sub-band signals $y_{sb}(n)$ that have an even index number. The remaining reference sub-band signals $x_{sb,g}$ may next be passed to the echo compensation filter 208 where error signals $e_{sb,g}(n)$ are obtained. The error signals $e_{sb,g}(n)$ represent echo compensated audio sub-band signals.

In one implementation, the detected sub-band signals and the reference sub-band signals may down-sampled by a factor r. The audio sub-band signals $y_{sb}(n)$ and the reference sub-band signals $x_{sb,g}(n)$ may be down-sampled with respect to the audio signal $y(n)$ and the reference signal $x(n)$, respectively, by the same down-sampling factor r. If, e.g., a Hann window is used for the analysis filter banks 204 and 210, then the length of the analysis filters may be equal to the number of sub-bands M. For a typical processing of the analysis and the synthesis filter bank by Discrete Fourier Transformation (DFT), for example, the lengths of the analysis and the synthesis filter banks may be the same and equal to the number of sub-bands M. In one implementation, a down-sampling factor of r=M/4 may be used, which allows for good re-synthesis of the audio sub-band signals. The spectra of the down-sampled reference sub-band signals may be represented by:

$$X_\mu(e^{j\Omega}) = \sum_{m=0}^{r-1} X\left(e^{j\left[\frac{\Omega}{r} - \frac{2\pi}{r}m\right]}\right) G_{\mu,ana}\left(e^{j\left[\frac{\Omega}{r} - \frac{2\pi}{r}m\right]}\right)$$

for each sub-band $\mu$.

By down-sampling the audio sub-band signals with respect to the audio signal detected by a microphone (e.g., with a sampling rate of about 8 kHz) the computational load may be reduced. An increase in the rate r may result in a reduction of the computational load. Due to the finite-slope filter flanks, r=M may be an upper limit for the sampling rate r, where M represents the number of sub-bands (e.g., the number of channels of the analysis filter banks 204 and 210).

In the implementation shown in FIG. 2, the error signals $e_{sb,g}(n)$ are further processed for noise reduction and reduction of residual echoes by a post-filter 214. The post-filter 214 may be a Wiener filter. The residual echoes may be due to imperfect adaptation of the echo compensation filter 208. The filter characteristics of the post-filter 214 may be adapted based on the estimated auto power density of the error signals $e_{sb,g}(n)$ and the perturbation that is still present in the error signals $e_{sb,g}(n)$ (i.e., the echo compensated audio sub-band signals) in form of background noise and residual echoes.

The enhanced sub-band signals $\hat{s}_{sb,g}(n)$ may be transferred from the post-filter 214 to a processor 216. The processor 216 serves to reconstruct at least some of the excised audio sub-band signals. Specifically, the processor 216 may reconstruct sub-band signals for the audio sub-band signals that were excised by the filter 206. In the implementation of FIG. 2, the filter 206 excised the audio sub-band signals with odd index numbers. Therefore, the processor 216 generates audio sub-band signals to replace the original audio sub-band signals that had odd index numbers. The processor 216 may use the remaining audio sub-band signals to reconstruct the excised audio sub-band signals.

In one implementation, reconstruction may be based on one previous and one following sub-band vector. From the vector of the audio signal $y(n)$, where n is the discrete time index, a vector of some length M+2r (where r denotes the factor of down-sampling of the sub-band signals) is extracted:

$$y(n) = [y(n+r), y(n+r-1), \ldots, y(n-M-r+1)]^T$$

where the upper index T denotes the transposition operation. Windowing may be performed by:

$$F = \begin{bmatrix} g_0 & 0 & 0 & \ldots & 0 \\ 0 & g_1 & 0 & \ldots & 0 \\ 0 & 0 & g_2 & \ldots & 0 \\ \vdots & \vdots & \vdots & \ddots & \vdots \\ 0 & 0 & 0 & \ldots & g_{M-1} \end{bmatrix}$$

where the diagonal coefficients $g_0, \ldots, g_{M-1}$ are the coefficients of the $0^{th}$ prototype filter (e.g., a Hann window) of the analysis filter bank that is given by:

$$g_{\mu,ana} = [g_{\mu,0,ana}, g_{\mu,1,ana}, \ldots, g_{\mu,N_{ana}-1,ana}]^T.$$

The analysis filter banks may operate in the frequency ($\Omega$) domain and the frequency response of a prototype low-pass filter may be given by:

$$G_{0,ana,ideal}(e^{j\Omega}) = \begin{cases} 1, & \text{for } |\Omega| \leq \frac{2\pi}{M}, \\ \text{any}, & \text{for } \frac{2\pi}{M} < |\Omega| < \frac{2\pi}{r}, \\ 0, & \text{for } |\Omega| \geq \frac{2\pi}{r} \end{cases}$$

The other filters (sub-band index $\mu=1, \ldots, M-1$) may be obtained by frequency shifting. After supplementation of the window matrix F with M×r zeros (zero padding) on the left-hand and right-hand sides $F_0 = [0_{M \times r}\ F\ 0_{M \times r}]$, a windowed signal portion of the length M may be obtained by $F_0\ y(n)$. After transformation (e.g., by a DFT) the actual sub-band vector (at time n) may be obtained. The DFT may be formulated by the transformation matrix:

$$T = \begin{bmatrix} 1 & 1 & 1 & \ldots & 1 \\ 1 & e^{-j\frac{1}{M}2\pi} & e^{-j\frac{2}{M}2\pi} & \ldots & e^{-j\frac{M-1}{M}2\pi} \\ 1 & e^{-j\frac{2}{M}2\pi} & e^{-j\frac{4}{M}2\pi} & \ldots & e^{-j\frac{2(M-1)}{M}2\pi} \\ \vdots & \vdots & \vdots & \ddots & \vdots \\ 1 & e^{-j\frac{M-1}{M}2\pi} & e^{-j\frac{2(M-1)}{M}2\pi} & \ldots & e^{-j\frac{(M-1)(M-1)}{M}2\pi} \end{bmatrix}.$$

The sub-band signal may be down-sampled by the factor r and, thus, the down-sampled sub-band signal at time n may be obtained by:

$$y_{sb}(n) = T F_0 y(nr).$$

By means of the respective window matrices for the previous (n−1) and subsequent (n+1) sub-band vectors:

$$F_{-1} = [F\ 0_{M \times 2r}] \text{ and } F_1 = [0_{M \times 2r}\ F],$$

the following signal vectors may be obtained:

$$y_{sb}(n-1) = T F_{-1} y(nr) \text{ and } y_{sb}(n+1) = T F_1 y(nr).$$

In order to extract odd sub-band vectors only the matrix:

$$E_u = \begin{bmatrix} 0 & 1 & 0 & 0 & 0 & 0 & \ldots & 0 & 0 \\ 0 & 0 & 0 & 1 & 0 & 0 & \ldots & 0 & 0 \\ 0 & 0 & 0 & 0 & 0 & 1 & \ldots & 0 & 0 \\ \vdots & \vdots & \vdots & \vdots & \vdots & \vdots & \ddots & \vdots & \vdots \\ 0 & 0 & 0 & 0 & 0 & 0 & \ldots & 0 & 1 \end{bmatrix}$$

is defined to obtain sub-bands for odd sub-band indices:

$$y_{sb,u}(n) = E_u y_{tb}(n) = E_u TF_0 y(nr).$$

Similarly, extraction of sub-band signals with even indices results from $$y_{sb,g}(n-i) = E_g y_{sb}(n-i) = E_g TF_{-i} y(nr); i = \pm 1,$$

with the extraction matrix:

$$E_g = \begin{bmatrix} 1 & 0 & 0 & 0 & 0 & 0 & \ldots & 0 & 0 \\ 0 & 0 & 1 & 0 & 0 & 0 & \ldots & 0 & 0 \\ 0 & 0 & 0 & 0 & 0 & 1 & \ldots & 0 & 0 \\ \vdots & \vdots & \vdots & \vdots & \vdots & \vdots & \ddots & \vdots & \vdots \\ 0 & 0 & 0 & 0 & 0 & 0 & \ldots & 1 & 0 \end{bmatrix}.$$

Reconstruction of the odd sub-band vectors may be achieved by interpolation of even sub-band vectors. At time n a reconstructed odd sub-band vector $\hat{y}_{sb,u}(n)$ may be calculated from an actual (time is n) even sub-band signal vector $y_{sb,g}(n)$ and a previous (time is n−1) and a sub-sequent (time is n+1) even sub-band vector:

$$\hat{y}_{sb,u}(n) = C_1 y_{sb,g}(n+1) + C_0 y_{sb,g}(n) + C_{-1} y_{sb,g}(n-1)$$

with the interpolation matrices $C_1$, $C_0$, $C_{-1}$. In principle, averaging by more than two adjacent (in time) signal vectors may be performed, e.g., $$\hat{y}_{sb,u}(n) = C_2 y_{sb,g}(n+2) + C_1 y_{sb,g}(n+1) + C_{-1} y_{sb,g}(n-1) + C_{-2} y_{sb,g}(n-2).$$

With the above expression for sub-band signals with even indices one gets for the interpolation with $C_1$, $C_0$, and $C_{-1}$:

$$\hat{y}_{sb,u}(n) = C_1 E_g TF_1 y(nr) + C_0 E_g TF_0 y(nr) + C_{-1} E_g TF_{-1} y(nr)$$
$$= [C_1 E_g TF_1 + C_0 E_g TF_0 + C_{-1} E_g TF_{-1}] y(nr)$$

This expression may be represented by:

$$\hat{y}_{sb,u}(n) = C_{ges} D_{E_g T} F_{ges} y(nr)$$

with $C_{ges} = [C_1 \; C_0 \; C_{-1}]$ and the block diagonal matrix:

$$D_{E_g T} = \begin{bmatrix} E_g T & 0 & 0 \\ 0 & E_g T & 0 \\ 0 & 0 & E_g T \end{bmatrix}$$

and the total window matrix $$F_{ges} = \begin{bmatrix} F_1 \\ F_0 \\ F_{-1} \end{bmatrix}.$$

In one implementation, to find a reconstruction for the previously excised sub-band vector, the $L_2$-norm of the difference vector may be minimized:

$$\|y_{sb,u}(n) - \hat{y}_{sb,u}(n)\|_2, \text{ i.e., } \|E_u TF_0 y(nr) - C_{ges} D_{E_g T} F_{ges} y(nr)\|_2.$$

The minimization may be achieved in a sufficiently good approximation by determining $C_{ges}$ such that each row of the matrix $E_u TF_0 - C_{ges} D_{E_g T} F_{ges}$, has a minimal $L_2$-norm. This may be achieved by the Moore-Penrose-pseudo inverse:

$$(D_{E_g T} F_{ges})' \text{ of the matrix } (D_{E_g T} F_{ges}).$$

Thus, $C_{ges}$ may be expressed by $C_{ges} = E_u TF_0 (D_{E_g T} F_{ges})'$, under the assumption that $(D_{E_g T} F_{ges})(D_{E_g T} F_{ges})^H$ is invertable (where the upper index H denotes the Hemite conjugate, i.e., the adjoint matrix). The Moore-Penrose-pseudo inverse may be calculated from:

$$(D_{E_g T} F_{ges})' = (D_{E_g T} F_{ges})^H [(D_{E_g T} F_{ges})(D_{E_g T} F_{ges})^H]^{-1}.$$

A direct use of the interpolation matrices $C_{-1}$ and $C_1$ may demand high computer capacities. Therefore, approximates of these matrices $C_{-1}$ and $C_1$ by their respective main and secondary diagonals may be used.

The output signals after echo compensation and/or other processing for noise reduction, dereverberation, etc., for the sub-bands that are not excised may be denoted by $\hat{s}_\mu(n)$, where $\mu$ is the sub-band index. $\hat{s}_\mu(n)$ may be determined for all sub-bands (including the reconstruction of the previously excised sub-band vectors) by the following equation:

$$\tilde{s}_\mu(n) = \begin{cases} \sum_{k=-1}^{1} \tilde{s}_{\mu-1}(n-k) C_k(\mu, \mu) + \sum_{k=-1}^{1} \tilde{s}_{\mu+1}(n-k) C_k(\mu, \mu+1), & \text{if } \mod(\mu, 2) = 1 \\ \tilde{s}_\mu(n-1), & \text{else} \end{cases}$$

where $C_k(n_1, n_2)$ denotes the element in the $n_1^{th}$ row and the $n_2^{th}$ column of the matrix $C_k$. This implies that even sub-bands are taken with a delay of one time increment (n−1).

Reconstruction of a previously excised sub-band signal may be based on more than one preceding and subsequent sub-band signal (n−1 and n+2). In particular, a different number of preceding and subsequent sub-band signals may be used for the interpolation ($C_0 \neq 0$).

A set (e.g., a complete set) of sub-band signals $\tilde{s}_{sb}(n)$ may be input into a synthesis filter bank 218 to synthesize the enhanced sub-band signals $\hat{s}_{sb,g}(n)$ with the reconstructed sub-band signals. The synthesis filter bank 218 may correspond to the analysis filter bank 204 used to divide the detected signal y(n) into the audio sub-band signals $y_{sb}(n)$. The synthesis filter bank 218 combines the enhanced sub-band signals with the reconstructed sub-band signals to form a full-band enhanced microphone signal $\tilde{s}(n)$. The synthesis filter bank 218 may include a Hann or Hamming window. The analysis filter banks 204 and 210 may down-sample the sub-band signals by a factor r. The synthesis filter bank 218 may up-sample the down-sampled reconstructed and enhanced microphone sub-band signals $\hat{s}_{sb,g}(n)$ by the same factor as the down-sampling factor r. The synthesis filter bank 218 may be represented by:

$$g_{\mu,syn} = [g_{\mu,0,syn}, \ldots, g_{\mu,N_{syn}-1,syn}]^T$$

For one application including M=256 sub-bands and down-sampling rates of r=64 and r=72, for example, computational time and memory demand may be reduced by about 50% as compared to standard DFT processing. The time for signal processing (delay time) may only be a few milliseconds above the time delay of standard processing by means of polyphase filter banks. Also, the delay time may be below the threshold according to the Global System for Mobile communications (GSM) standards of 39 ms in vehicle cabins. Moreover, the adaptation velocity of the echo compensation filter 208 may only be slightly different standard processing.

Figure 3:
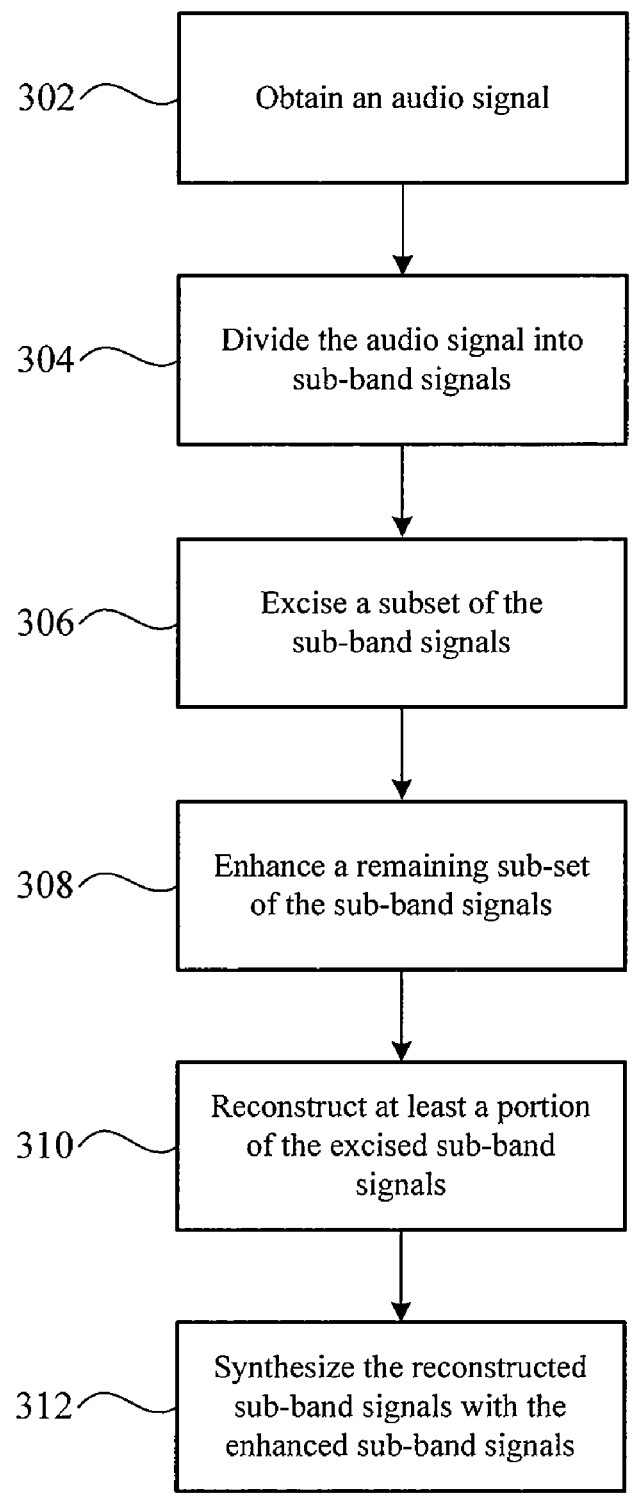
FIG. 3 is a process that enhances an audio signal.

FIG. 3 is a process that enhances an audio signal by processing the signal in the sub-band regime. At act 302, an audio signal is obtained. The audio signal may be a speech signal representing an utterance by a local speaker. A microphone or other detection device may detect the audio signal. Alternatively, the audio signal may be detected by a microphone array to obtain a number of microphone signals that may by processed by beamforming. In this case, the signal processing described in the following acts may be applied to each of the microphone signals obtained by the microphones of the microphone array. At act 304, the audio signal is divided into audio sub-band signals. Some or all of these audio sub-band signals may be subsequently processed to enhance the quality.

After dividing the audio signal into audio sub-band signals, a portion of the audio sub-band signals may be excised at act 306. In one implementation, all microphone sub-band signals $y_\mu$ with an odd index may be excised and only microphone sub-band signals $y_\mu$ with an even index $\mu \in \{0, 2, 4, \ldots, M-2\}$ may be maintained. In another implementation, all microphone sub-band signals $y_\mu$ with an even index may be excised and only microphone sub-band signals $y_\mu$ with an odd index $\mu \in \{1, 3, 5, \ldots, M-1\}$ may be maintained. By excising about half of the audio sub-band signals, the processing and memory demands may accordingly be reduced by about half.

In another implementation, the audio sub-band signals are selectively excised. The system may excise audio sub-band signals above or below a predetermined frequency threshold. In particular, selected audio sub-band signals may be excised in one frequency range of the sub-band signals, while the sub-band signals in other frequency ranges are not excised or are excised to a lesser degree. In another implementation, a greater percentage of the audio sub-band signals that are above or below a predetermined frequency threshold may be excised. For example, a first percentage of audio sub-band signals may be excised in a first frequency range, while a second percentage of audio sub-band signals may be excised in a second frequency range. The first percentage may be the same or different than the second percentage. Also, the percentages are adjustable and may be as high as 100% or as low as 0%.

In one implementation, a predetermined number of audio sub-band signals may be excised only from a high frequency range (e.g., above some threshold, such as above 1 kHz, 1.5 kHz, or 2 kHz) while keeping all (or substantially all) of the audio sub-band signals in a lower frequency range. Thereby, a variety of compromises between saving computational costs and achieving high signal quality may be achieved.

At act 308, the remaining audio sub-band signals may be enhanced. The remaining sub-band signals may be processed for echo compensation, dereverberation, noise reduction, and/or another signal enhancement technique. At act 310, at least a portion of the previously excised sub-band signals are reconstructed. In one implementation, excised audio sub-band signals may be reconstructed from the remaining audio sub-band signals. At act 312, the reconstructed sub-band signals are synthesized with the enhanced sub-band signals to generate a full-band enhanced audio signal.

Figure 4:
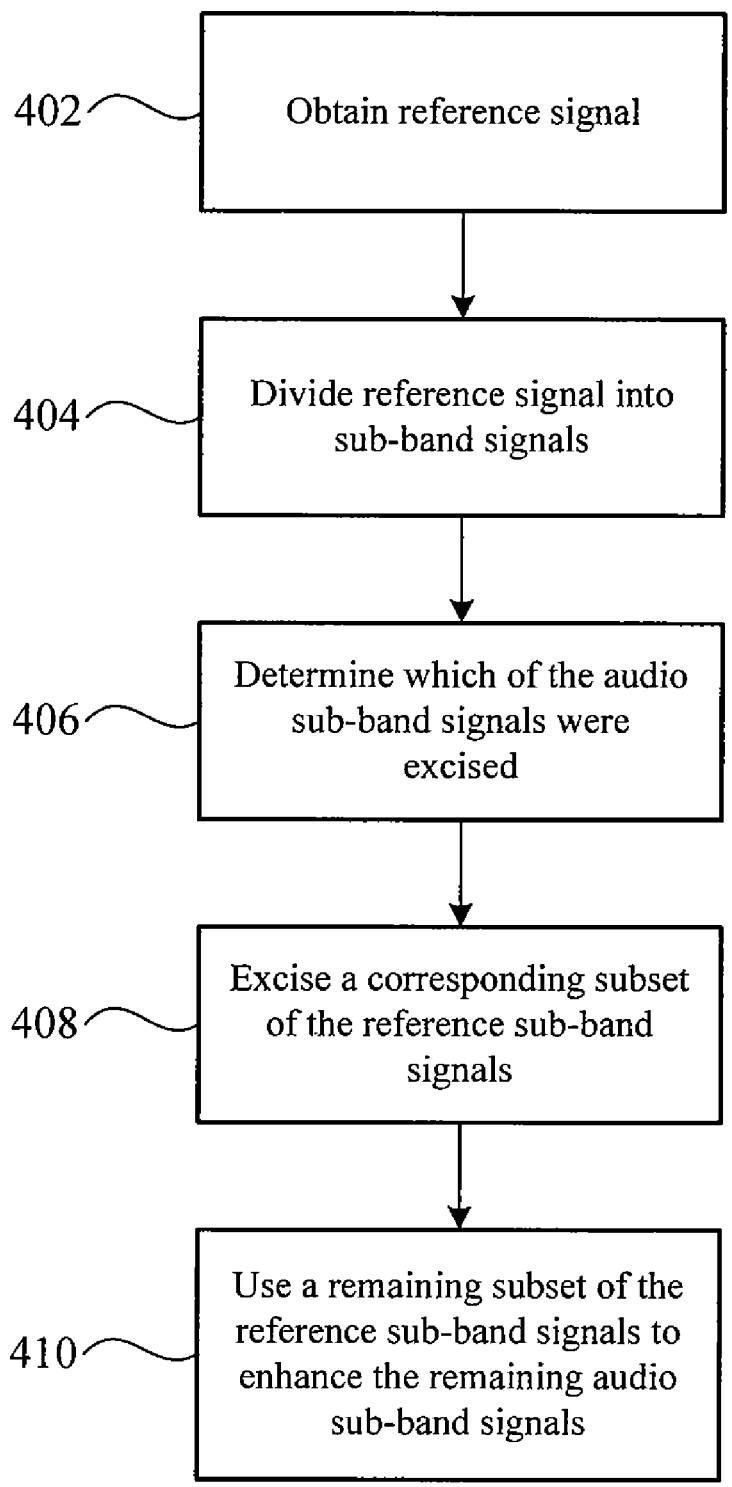
FIG. 4 is a process that uses a reference signal to enhance an audio signal.

FIG. 4 is a process that uses a reference signal to enhance an audio signal. At act 402, a reference signal is obtained. In one implementation, the reference signal represents a noise component that may exist in a detected signal. In another implementation, the reference signal is a signal that represents possible echo components that may exist in a detected signal. Specifically, the reference signal may be an audio signal that is transmitted from a system loudspeaker and may be detected by a system microphone.

At act 404, the reference signal is divided into reference sub-band signals. After dividing the reference signal into reference sub-band signals, a portion of the reference sub-band signals may be excised. In one implementation, the reference sub-band signals may be excised to the same degree as the audio sub-band signals. At act 406, it is determined which of the audio sub-band signals were excised at act 306 of FIG. 3. In one implementation, the microphone sub-band signals with an odd index number were excised and the microphone sub-band signals with an even index number were maintained. In another implementation, the microphone sub-band signals with an even index number were excised and the microphone sub-band signals with an odd index number were maintained. In yet another implementation, a different excising scheme was implemented.

At act 408, a subset of the reference sub-band signals are excised. The excised subset may correspond to the subset of the audio sub-band signals that were excised. If the audio sub-band signals with odd index numbers were excised, then the reference sub-band signals with odd index numbers may also be excised at act 408. Therefore, the remaining subset of the reference sub-band signals may correspond to the remaining subset of the audio sub-band signals.

At act 410, the remaining reference sub-band signals are used to enhance the remaining audio sub-band signals. In one implementation, the remaining reference sub-band signals may represent a noise or echo component that may be present in the remaining audio sub-band signals. Therefore, the remaining reference sub-band signals may be used to attenuate the noise or echo components present in the remaining audio sub-band signals. In one implementation, the filter coefficients of an echo compensation filter may be adapted based on the remaining reference sub-band signals and sub-band error signals. The remaining audio sub-band signals may then be filtered by the adapted filter coefficients to reduce echo contributions in the remaining audio sub-band signals. Specifically, estimated echo contributions may be subtracted from the remaining audio sub-band signals.

Figure 5:
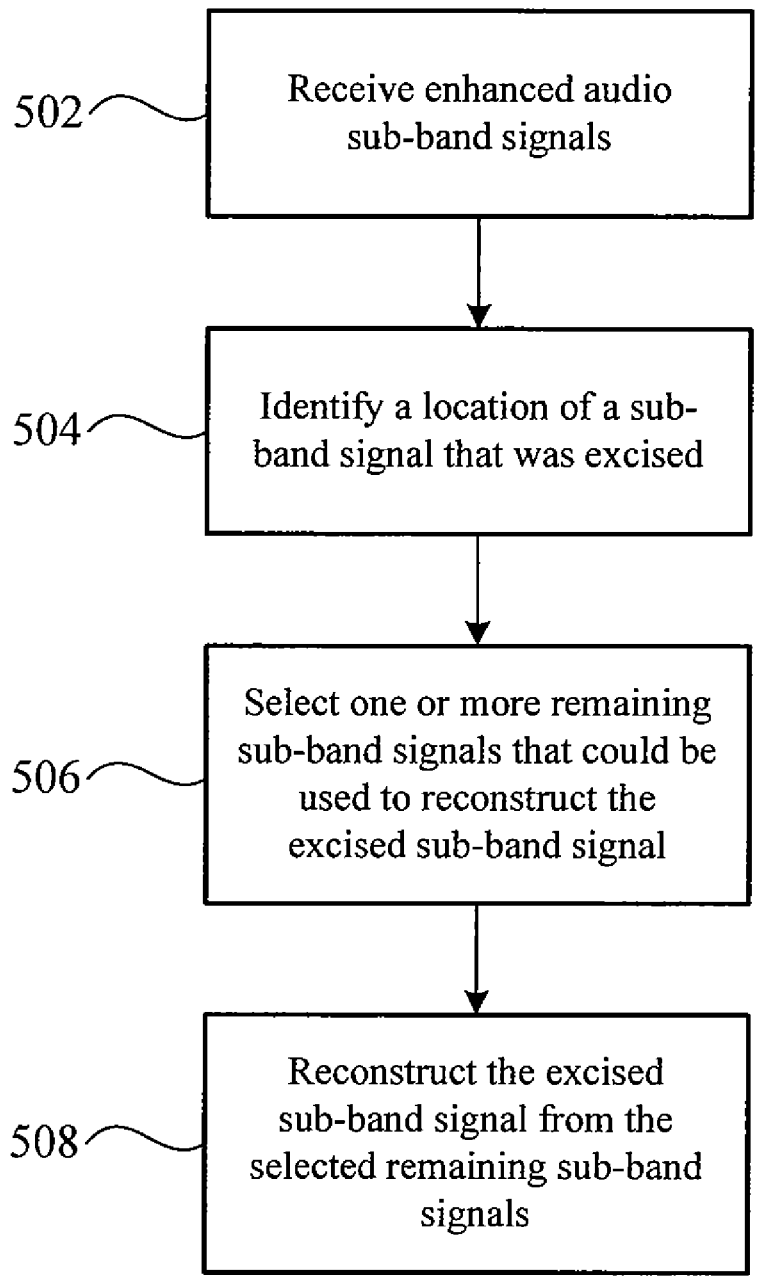
FIG. 5 is a process that reconstructs excised sub-band signals.

FIG. 5 is a process that reconstructs excised sub-band signals. At act 502, enhanced audio sub-band signals are received. The enhanced audio sub-band signals may be enhanced versions of the audio sub-band signals that were not excised at act 306 of FIG. 3. At act 504, the excised sub-band signals are identified. For example, locations of excised sub-band signals may be identified within the full-band spectrum. At act 506, one or more of the remaining sub-band signals are selected for use to reconstruct the excised sub-band signals.

At act 508, the excised sub-band signal is reconstructed based on the selected remaining sub-band signals. An excised sub-band signal may be reconstructed by averaging multiple remaining audio sub-band signals. The reconstruction generates an audio sub-band signal to replace the identified excised audio sub-band signal. The excised sub-band signals may be reconstructed from one, two, or more remaining sub-band signals. In one implementation, an excised sub-band signal may be reconstructed by averaging remaining audio sub-band signals that are adjacent in time to the excised audio sub-band signal. In another implementation, an excised audio sub-band signal from a particular time may be reconstructed by interpolation of remaining audio sub-band signals from the particular time and remaining audio sub-band signals that are adjacent in time.

The reconstruction may be a weighted average of multiple remaining sub-band signals. In an implementation where two sub-band signals are averaged to reconstruct an excised sub-band signal, a first weighting factor may be applied to the first sub-band signal and a second weighting factor may be applied to the second sub-band signal. The relative weights of the multiple sub-band signals may be controlled or adjusted to reconstruct the excised sub-band signals.

In one implementation, at least at one time (n) the audio sub-band signals for the predetermined sub-bands for which audio sub-band signals were excised may be reconstructed for the predetermined sub-bands by averaging the remaining audio sub-band signals that are adjacent in time (n+k, n−k), where n is the discrete time index and k is an integer, $k \geq 1$; k=1, 2, etc. Thus, the term adjacent may include the closest adjacent signals (in time) as well as some number of neighbors. A reconstructed audio sub-band signal at frequency bin j may be calculated by averaging enhanced (e.g., echo/noise compensated) remaining audio sub-band signals at frequency bins j+1 and j−1. If a predetermined number of microphone sub-band signals are excised all over the set of sub-bands ($\mu=1, \ldots, M$) averaging may be performed also all over the entire range of sub-bands. Alternatively, it may be preferred to reconstruct a part of the excised microphone sub-band signals only. Reconstruction may be variably performed according to the actual application. Averaging may include different weights (interpolation matrices) for the audio sub-band signals at times n+1, n and n−1 (and further adjacent values, when used).

In another implementation, the excised microphone sub-band signals at time n may be reconstructed by interpolation of remaining microphone sub-band signals at the time n and remaining microphone sub-band signals adjacent in time (e.g., one or more previous signal vectors and/or subsequent signal vectors). Accurate reconstruction with tolerable artifacts may thereby be achieved. To achieve a significant reduction of the need for computational resources, the interpolation may be performed by interpolation matrices which are approximated by their main diagonals and secondary diagonals, respectively.

Figure 6:
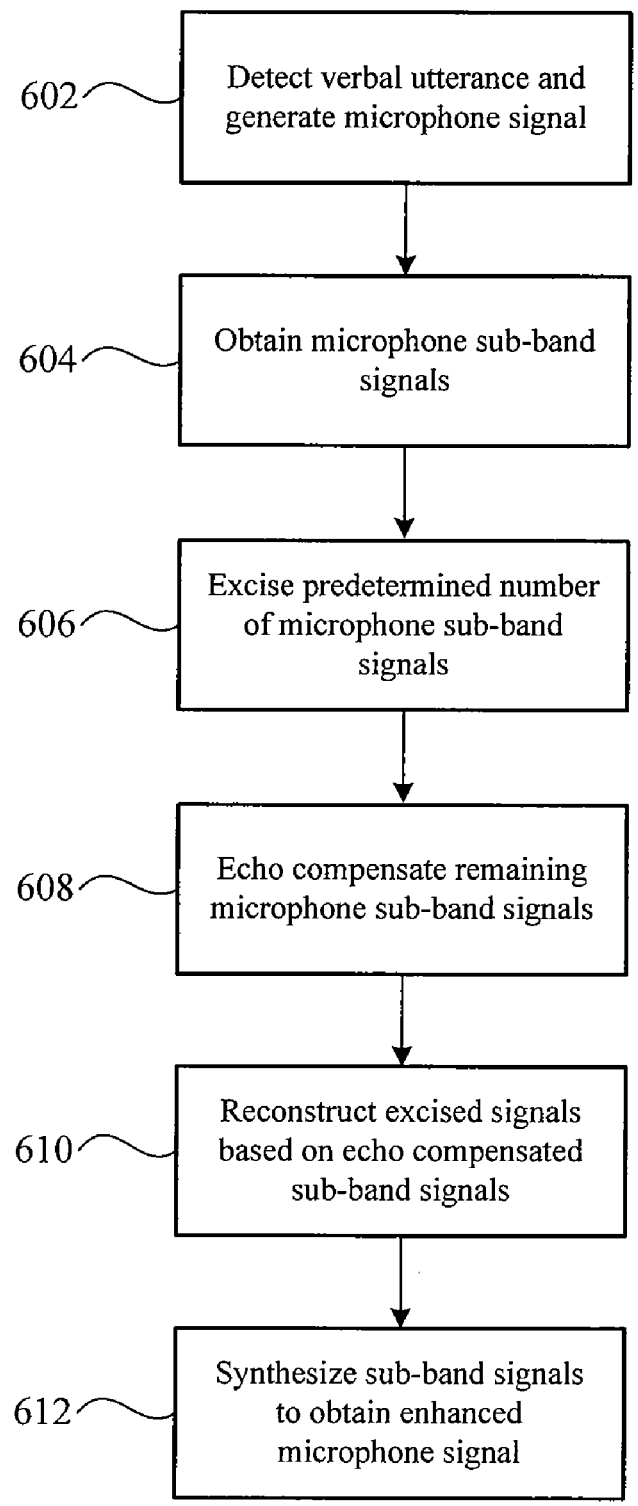
FIG. 6 is a process that compensates for echo in a microphone signal.

FIG. 6 is a process that compensates for echo in a microphone signal. At act 602, a verbal utterance is detected by a microphone. The microphone then generates a microphone signal that represents the verbal utterance. At act 604, microphone sub-band signals are obtained. Specifically, the microphone signal may be divided into multiple microphone sub-band signals. At act 606, a predetermined number of the microphone sub-band signals are excised.

At act 608, the remaining microphone sub-band signals are echo compensated. Specifically, the echo compensation may attempt to attenuate echo components in the remaining microphone sub-band signals. Echo compensated microphone sub-band signals may be further processed for noise reduction. Moreover, the microphone sub-band signals may be de-correlated by a time-invariant de-correlation filter (e.g., a filter of the first or second order) or by an adaptive de-correlation means in order to improve the convergence speed of the adaptation process of the filter coefficients of the echo compensation filter.

At act 610, the excised sub-band signals may be reconstructed based on the echo compensated sub-band signals. At act 612, the sub-band signals are synthesized to obtain an enhanced microphone signal. The echo compensated sub-band signals may be combined with the reconstructed sub-band signals to obtain the full-band enhanced microphone signal.

Each of the processes described may be encoded in a computer readable medium such as a memory, programmed within a device such as one or more circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A computer-readable medium, machine-readable storage medium, propagated-signal medium, and/or signal-bearing medium may comprise any device that contains, stores, communicates, propagates, or transports software for use by or in connection with an instruction executable system, apparatus, or device. The machine-readable medium may selectively be, but not limited to, an electronic, magnetic, optical, electro-magnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for audio signal processing, comprising:
   dividing an audio signal into audio sub-band signals;
   excising a subset of the audio sub-band signals;
   processing a remaining subset of the audio sub-band signals to obtain enhanced audio sub-band signals;
   reconstructing at least a portion of the subset of the audio sub-band signals that were excised; and
   synthesizing the enhanced audio sub-band signals with the reconstructed audio sub-band signals to form an enhanced audio signal.

2. The method of claim 1, where the act of reconstructing comprises reconstructing an excised audio sub-band signal from one or more of the enhanced audio sub-band signals.

3. The method of claim 1, where the act of reconstructing comprises averaging a first sub-band signal of the enhanced audio sub-band signals and a second sub-band signal of the enhanced audio sub-band signals to generate an audio sub-band signal to replace one of the excised audio sub-band signals.

4. The method of claim 3, where the act of averaging comprises applying a first weighting factor to the first sub-band signal and a second weighting factor to the second sub-band signal.

5. The method of claim 1, where the act of reconstructing comprises reconstructing an excised audio sub-band signal by averaging remaining audio sub-band signals that are adjacent in time to the excised audio sub-band signal.

6. The method of claim 1, where the act of reconstructing comprises reconstructing excised audio sub-band signals from a particular time by interpolation of remaining audio sub-band signals from the particular time and remaining audio sub-band signals that are adjacent in time.

7. The method of claim 1, where the act of excising comprises excising a first percentage of audio sub-band signals in a first frequency range and excising a second percentage of audio sub-band signals in a second frequency range, where the first percentage is different than the second percentage.

8. The method of claim 1, where the act of synthesizing comprises:
   up-sampling the enhanced audio sub-band signals;
   up-sampling the reconstructed audio sub-band signals; and
   combining the up-sampled enhanced audio sub-band signals and the up-sampled reconstructed audio sub-band signals to form the enhanced audio signal.

9. The method of claim 1, where the act of processing comprises:
   dividing a reference signal into reference sub-band signals;
   excising a subset of the reference sub-band signals that is equal in number to the excised subset of the audio sub-band signals;
   adapting filter coefficients of an echo compensation filter based on a remaining subset of the reference sub-band signals; and
   using the adapted filter coefficients to remove echo components from at least a portion of the remaining subset of the audio sub-band signals.

10. A method for audio signal processing, comprising:
    dividing an audio signal into audio sub-band signals;
    excising a subset of the audio sub-band signals;
    processing a remaining subset of the audio sub-band signals to obtain enhanced audio sub-band signals;
    reconstructing at least a portion of the subset of the audio sub-band signals that were excised; and
    synthesizing the enhanced audio sub-band signals with the reconstructed audio sub-band signals to form an enhanced audio signal;
    wherein here the act of processing comprises:
    dividing a reference signal into reference sub-band signals;
    excising a subset of the reference sub-band signals that is equal in number to the excised subset of the audio sub-band signals;
    adapting filter coefficients of an echo compensation filter based on a remaining subset of the reference sub-band signals; and
    using the adapted filter coefficients to remove echo components from at least a portion of the remaining subset of the audio sub-band signals.

* * * * *